March 9, 1943. K. P. BRACE ET AL 2,313,218
INSPECTION OF SURFACES
Filed June 24, 1939 2 Sheets-Sheet 1

INVENTOR.
KEMPER P. BRACE
BY HERBERT C. WATERMAN
M. W. McConkey
ATTORNEY.

Patented Mar. 9, 1943

2,313,218

UNITED STATES PATENT OFFICE 2,313,218

INSPECTION OF SURFACES

Kemper P. Brace, South Bend, and Herbert C. Waterman, Elkhart, Ind.

Application June 24, 1939, Serial No. 280,942

8 Claims. (Cl. 88—14)

This invention relates to the inspection of finished surfaces, and is described below as applied to the inspection of the finish of the surfaces of the walls of the bores of cylinders used in hydraulic braking systems.

An object of the invention is to determine quickly and accurately the degree of roughness of a surface, as for example a machined surface such as the wall of the bore of a brake cylinder.

When a beam of light is projected upon such a surface, it is reflected as a reflected beam, which would include all of the light if the surface were perfectly smooth. Any irregularities in the surface scatter some of the light, however, and the smoothness of the surface may for inspection purposes be regarded as inversely in proportion to the ratio of the scattered light to the reflected beam.

Where the roughness of the surface is in the form of uniformly spaced parallel machine tool marks, and the incident beam is perpendicular thereto, diffraction takes place resulting in the reflection of colored bands on either side of the reflected beam. It is still true, however, that the difference in intensity of the reflected beam and the scattered light or "field" is an accurate measure of the roughness of the surface, provided the average field intensity is considered rather than the intensity of any one point.

It is an object of the present invention to provide a practical method of, and apparatus for, indicating the smoothness of a surface, as for example in the bore of a brake cylinder, by comparison of the intensities of the reflected beam and of the field of scattered light. Preferably these are respectively intercepted by two light-sensitive cells arranged in a novel circuit described below, the indication being on an instrument controlled by an electric current whose magnitude depends on the resistances of said cells. Another object of the invention is to increase the sensitivity of the indication by current amplifying means of the electronic type.

The above and other objects and features of the invention will be apparent from the description of the apparatus illustrated in the accompanying drawings, in which.

Figure 1:
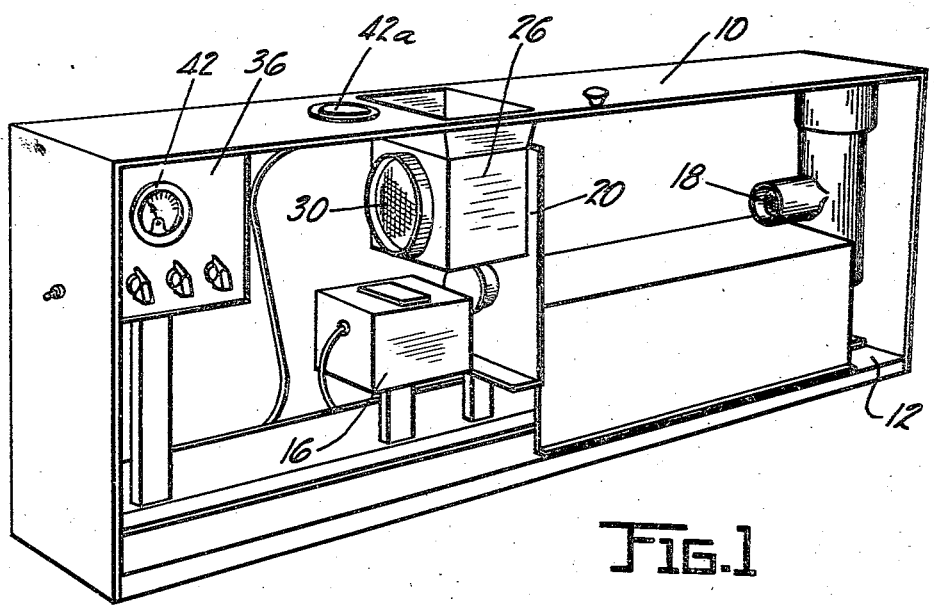
Figure 1 is a perspective view of the apparatus, with one side of the casing removed.
Figure 2:
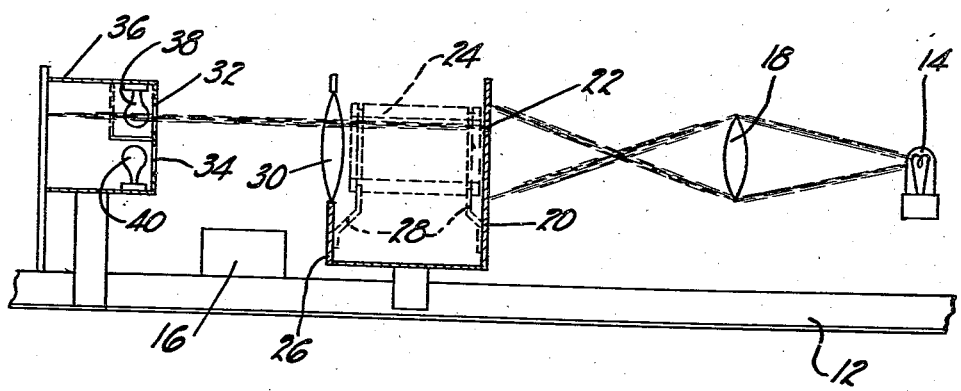
Figure 2 is a diagrammatic vertical longitudinal section through the apparatus.
Figure 2A:
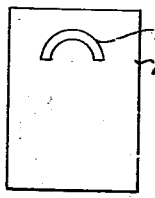
Figure 2a is an elevation view of a partition forming a part of the apparatus, showing the shape of an aperture therein.

The apparatus shown in Figures 1 and 2 comprises a substantially light-tight casing 10 which has a bottom 12 serving as a base, and within which is a source of light such as a bulb 14 supplied with current from a suitable constant voltage transformer 16. Light from the source 14 passes through a condensing lens 18 and falls upon a plate or partition 20. This partition is formed with a semicircular slot 22 through which the incident light beam impinges at a slight angle against the surface of the inner wall of the cylindrical bore of a brake cylinder 24 which is inserted manually through the open upper end of a cylinder-receiving casing 26.

The cylinder 24 is rotatably supported by a pair of saddles or brackets 28, so that it can be turned about its axis to inspect the entire internal surface. The reflected beam, and the reflected scattered light or "field," pass through another suitable lens 30.

If the lens 30 projected the light upon a screen, at least a fairly good qualitative inspection could be made visually. However, according to one important feature of our invention, a quantitative measurement is made possible by projecting the reflected beam, and the scattered light or "field," respectively through openings 32 and 34 in a casing 36 upon light-sensitive cells or bulbs 38 and 40. These are of the type whose resistance varies according to the intensity of the light impinging upon them.

The casing 36 also contains the electrical circuit described below, and an indicating instrument 42 therefor may be mounted thereon. If preferred, an instrument 42ª may be mounted on the top of the casing 10, or both instruments may be used, connected in series.

Figure 3:
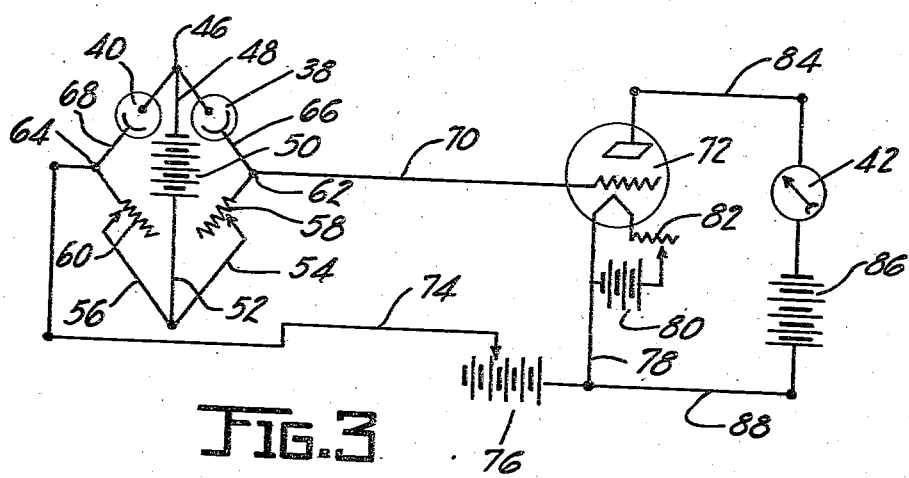
Figures 3 and 4 are wiring diagrams showing alternative circuits for the apparatus.

When the above-described parts are connected up as illustrated in Figure 3, the cells 38 and 40 are of the gas-filled electronic type which do not generate electric current when exposed to light but which allow passage of current through them when connected to an outside source such as a battery, which current over a wide range is directly proportional to the quantity of light falling upon them. In effect the cells act as variable resistors whose resistance is inversely proportional to the amount of light they receive.

Both of the cells 38 and 40 are connected at 46 to one lead 48 from a battery 50, the other pole of which is connected by a lead 52 to parallel connections 54 and 56 to variable calibrating resistances 58 and 60. These resistances are connected at 62 and 64 to leads 66 and 68 from the cells 38 and 40.

Now if resistances 58 and 60 are equal, and if the resistances in cells 38 and 40 are equal, the potential difference between 62 and 64 is zero. If the resistances in 38 and 40 change but remain equal to each other, this potential difference is still zero. If, however, the resistance of cell 38 is greater or less than that of cell 40, there will be a potential difference between 62 and 64, its polarity depending on whether the resistance of cell 38 is greater or less than that of cell 40. Its magnitude will depend upon the magnitude of the difference between the resistances of the cells 38 and 40. Since these resistances depend upon the amount of light falling on the cells, the potential difference between 62 and 64 is a measure of the difference of the light intensities at 38 and at 40.

Since this potential difference is extremely small, we prefer to amplify its effect by electronic means. As shown, point 62 is connected by a lead 70 to the grid of a three-element tube 72. The point 64 is connected by a lead 74 through a grid-biasing "C" battery 76 to a lead 78 connected to the filament of the tube 72. The filament is heated by the usual "A" battery 80 shown connected to the filament through a variable resistance 82. The plate of the tube 72 is connected by a lead 84, through the indicating instrument 42 (or 42a, or both), to one pole of a "B" battery 86, the other pole of which is connected by a lead 88 to the lead 78 of the filament.

By this means the small potential difference between points 62 and 64 controls a current of considerable magnitude in the circuit of the indicating instrument 42 in such a manner that the flow of current in this circuit is proportional to the potential difference between points 62 and 64.

Figure 4:
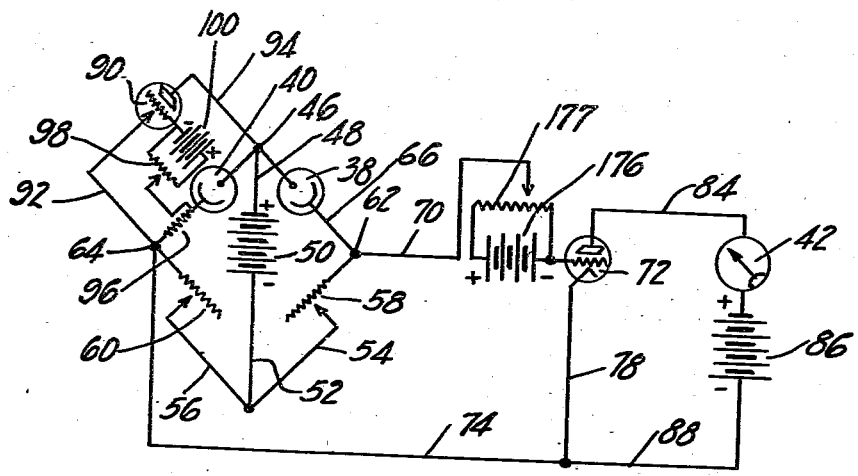

In Figure 4, the parts of the circuit which are functionally the same as in Figure 3 are designated by the same reference characters, and analogous parts are given reference characters 100 greater. The amplifying circuit is substantially the same except for the addition of a potentiometer 177 connected across the grid-biasing battery 176, permitting greater control of the grid-filament circuit.

In this case, however, to compensate for the fact that the intensity of the scattered light falling on the cell 40 is (or should be) very low as compared to that of the reflected beam falling on the cell 38, a second triode tube 90 is connected in a circuit arranged in parallel with the cell 40. The filament of this tube, heated by the usual filament circuit (not shown), is connected by a lead 92 with point 64. The plate is connected by a lead 94 with the point 46.

One terminal of the cell 40 is connected to point 46, and the other is connected through a resistance 96 to point 64. Between the cell 40 and the resistance 96 there is connected a lead to a variable resistance potentiometer 98 connected across a battery 100, the negative pole of which is connected to the grid of the tube 90.

As the grid of the tube 90 becomes more positive with respect to its cathode, the conductance of the tube increases, causing more current from battery 50 to flow through resistance 60. Since cell 40 and tube 90 are in parallel, and are both in series with the resistance 60, increased currents in the cell 40 and tube 90 are additive through resistance 60, causing a greater voltage drop across resistance 60 than the cell 40 would cause without the tube 90.

With no light on the photocells, and with tube 90 biased by battery 100 to a point where no plate current flows, there will be no potential difference between 62 and 64. With light on cell 40 only, there will be a current through resistance 60, and point 64 will become positive with respect to point 62, due to the voltage drop across the resistance 60. With light on cell 38 only, there will be a current through cell 38, resistance 58, and battery 50, causing a voltage drop across the resistance 58, which will make point 62 positive with respect to the point 64.

Since the circuit including the cell 40 is more sensitive than the circuit including cell 38, less light has to fall on cell 40 to cause a given current flow than is necessary to fall on cell 38; therefore, cell 40 is placed to receive the scattered "field" light and the cell 38 is placed to receive the reflected beam.

While one illustrative apparatus, and two circuits therefor, have been described in detail, it is not our intention to limit the scope of the invention to that particular apparatus, or to those circuits, or otherwise than by the terms of the appended claims.

We claim:

1. Apparatus for inspecting the finish of a cylindrical bore in a manufactured article, comprising means for supporting the article to permit rotation thereof about the axis of said bore, a light source placed in the prolongation of the axis of said bore, a condensing lens interposed between the article and the light source, for forming a beam consisting of diverging rays, a transverse partition placed intermediate the lens and the article, and having an opening therein for allowing a part of the light to strike a longitudinal section of the bore at an angle, and light responsive means intercepting the directly reflected light and substantially all of the diffusely reflected light.

2. Apparatus for inspecting the finish of a cylindrical bore in a manufactured article, comprising a substantially light-tight box including therein means for supporting the article to permit rotation thereof about the axis of said bore, a casing projecting inwardly into said box containing said supporting means, the end walls of said casing and said manufactured article forming a substantially light-tight closure when the article to be tested is placed on said supporting means, a light source placed substantially in a plane including the axis of said bore, a condensing lens interposed between the article and the light source, a transverse partition placed intermediate the lens and the article, and having a light transmitting portion therein for allowing a part of the light to strike a longitudinal section of the bore at an angle, and light responsive means intercepting the directly reflected light and a portion of the diffusely reflected light.

3. Apparatus for inspecting the finish of a cylindrical bore in a manufactured article comprising means for supporting the article to permit rotation thereof about the axis of said bore, a light source placed substantially in the prolongation of the axis of said bore, a lens means intermediate the article to be tested and the light source for forming a beam consisting of diverging rays, a partition between the lens means and the article and having an arcuate-shaped slot therein to give an arcuate cross-section to the light beam striking the wall of said bore and for excluding light rays which would not strike the wall of the bore, and light responsive means intercepting the specularly reflected light and a relatively large portion of the diffusely reflected light.

4. Apparatus for inspecting the finish of a cylindrical bore in a manufactured article comprising means for supporting the article to permit rotation thereof about the axis of said bore, a light source placed substantially in the prolongation of the axis of said bore, a lens means intermediate the article to be tested and the light source for forming a beam consisting of diverging rays, a partition between the lens means and the article and having an arcuate-shaped slot therein to give an arcuate cross-section to the light beam striking the wall of said bore and for excluding light rays which would not strike the wall of the bore, and means for indicating comparatively the intensity of the specularly reflected light and the scattered light, said means including means responsive to the specular reflection from said bore, means responsive to the light scattered by irregularities in said wall, and means intermediate the article and the last named light responsive means for collecting the scattered light and for directing a relatively large portion of it upon said last named light responsive means.

5. The method of inspecting the finish of cylindrical bores in manufactured parts which comprises directing angularly upon a portion of the surface of the bore of one of said parts a beam of light arcuate in cross-section, to produce a specularly reflected beam and scattered light in accordance with the nature of said surface, said arc being concentric with the axis of said bore, and the cross-sectional dimensions and the inclination of said beam being so related to the length of said bore that all the light rays of said beam are intercepted by said bore surface, causing the specularly reflected beam to produce a variation in one portion of an electrical circuit, collecting the light scattered by irregularities in said wall and utilizing said collected light to cause a variation in the other portion of the electrical circuit, causing a current to flow in said circuit in such a manner that at least at one point therein its magnitude is proportional to the ratio of said variations, and indicating said magnitude to show the smoothness of said finish.

6. The method of inspecting the finish of cylindrical bores in manufactured parts which comprises directing angularly upon a portion of the surface of the bore of one of said parts a beam of light arcuate in cross-section, to produce a specularly reflected beam and scattered light in accordance with the nature of said surface, said arc being concentric with the axis of said bore, and the cross-sectional dimensions and the inclination of said beam being so related to the length of said bore that all the light rays of said beam are intercepted by said bore surface, causing the specularly reflected beam to produce a variation in one portion of an electrical circuit, collecting the light scattered by irregularities in said wall and utilizing said collected light to cause a variation in the other portion of the electrical circuit, causing a current to flow in said circuit in such a manner that at least at one point therein its magnitude is proportional to the ratio of said variations, and rotating said part about the axis of its bore to present a different portion of the bore to the arcuate-shaped beam of light to permit inspection of the entire area of the bore.

7. The method of inspecting the finish of cylindrical bores in manufactured parts which comprises directing angularly upon a portion of the surface of the bore of one of said parts a beam of light arcuate in cross-section, to produce a specularly reflected beam and scattered light in accordance with the nature of said surface, said arc being concentric with the axis of said bore, and the cross-sectional dimensions and the inclination of said beam being so related to the length of said bore that all the light rays of said beam are intercepted by said bore surface, causing the specularly reflected beam to produce a variation in one portion of an electrical circuit, collecting the light scattered by irregularities in said wall and utilizing said collected light to cause a variation in the other portion of the electrical circuit, causing a current to flow in said circuit in such a manner that at least at one point therein its magnitude is proportional to the ratio of said variations, and amplifying said current electronically, and indicating said magnitude to show the smoothness of said finish.

8. Apparatus for inspecting the finish of a cylindrical bore in a manufactured article, comprising a substantially light-tight box including therein means for supporting the article to permit rotation thereof about the axis of said bore, a casing projecting inwardly into said box containing said supporting means, the end wall of said casing and said manufactured article forming a substantially light-tight closure when the article to be tested is placed on said supporting means, a light source placed in the prolongation of the axis of said bore, an optical system interposed between the article and the light source for forming a beam consisting of diverging rays, a transverse partition placed intermediate the optical system and the article and provided with an opening disposed eccentrically with respect to the bore axis whereby the light from said source is projected into said bore and strikes the wall of the bore at an angle, and light responsive means intercepting the specularly reflected light and a relatively large portion of the diffusely reflected light.

KEMPER P. BRACE.
HERBERT C. WATERMAN.